(12) United States Patent
Chen et al.

(10) Patent No.: US 6,389,510 B1
(45) Date of Patent: May 14, 2002

(54) METHOD AND APPARATUS FOR CACHING WEB-BASED INFORMATION

(75) Inventors: Kuo-Wei H. Chen, Scotch Plains; Chueng-Hsien Lin, Piscataway; Sanjoy Paul, Marlboro, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/557,552

(22) Filed: Apr. 25, 2000

(51) Int. Cl.[7] .............................................. G06F 12/08
(52) U.S. Cl. ...................... 711/113; 711/122; 709/213; 709/214
(58) Field of Search ................................ 711/3, 4, 101, 711/112, 113, 118, 122, 133, 155, 119; 709/203, 213, 215, 214

(56) References Cited

U.S. PATENT DOCUMENTS 5,694,571 A * 12/1997 Fuller .......................... 711/113
5,754,888 A * 5/1998 Yang et al. ................... 710/52
6,112,281 A * 8/2000 Bamford et al. ............. 711/141

OTHER PUBLICATIONS

Ballardie et al. "Core Based Tress (CBT): An Architecture for Scalable Inter–Domain Multicast Routing", Computer Communication Review, SIGCOMM'93, Conference Proceedings, pp. 85–95, Sep. 13–17, 1993.

* cited by examiner

Primary Examiner—B. James Peikari
(74) Attorney, Agent, or Firm—Moser, Patterson & Sheridan L.L.P.

(57) ABSTRACT

A caching device comprises a disk cache that stores web objects. Each web object stored in disk cache is stored in contiguous storage space locations in the disk cache. Each pair of temporally successive web objects stored in the disk cache are stored in substantially sequential storage space locations in the disk cache.

18 Claims, 6 Drawing Sheets

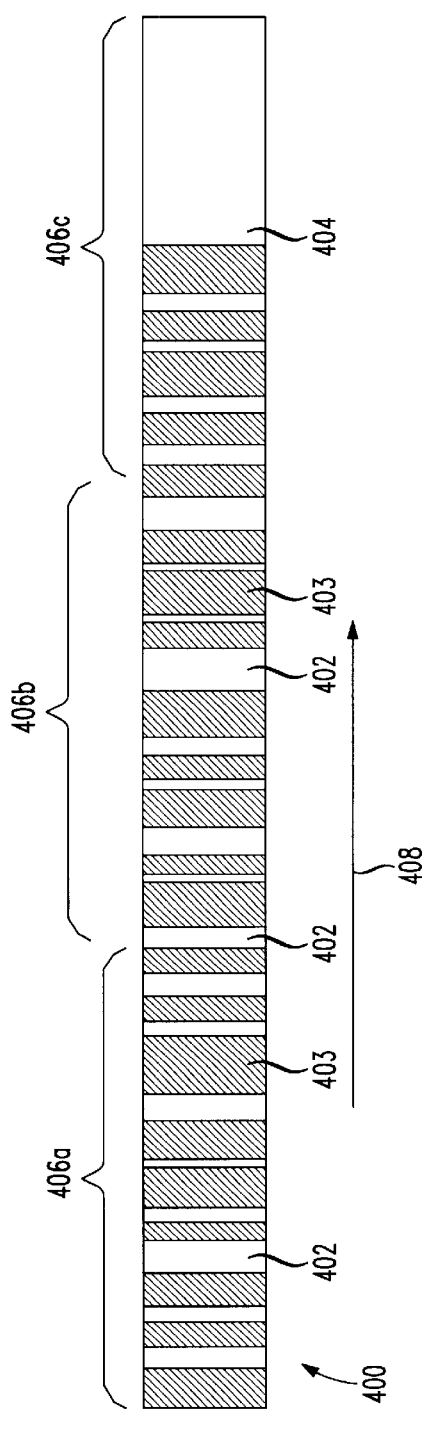
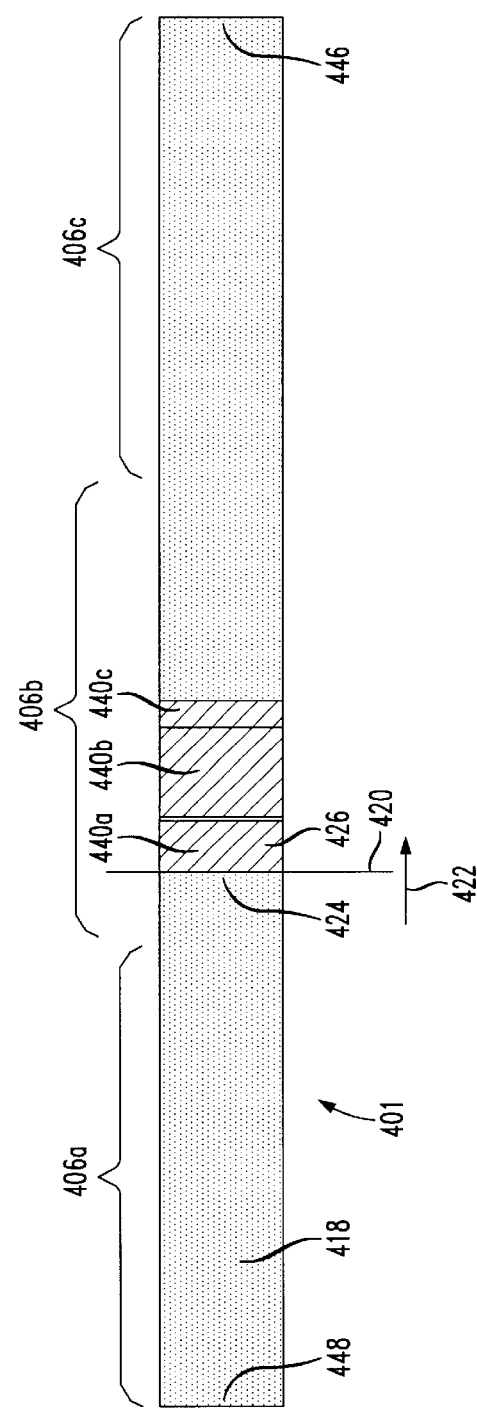
FIG. 4A
FIG. 4B

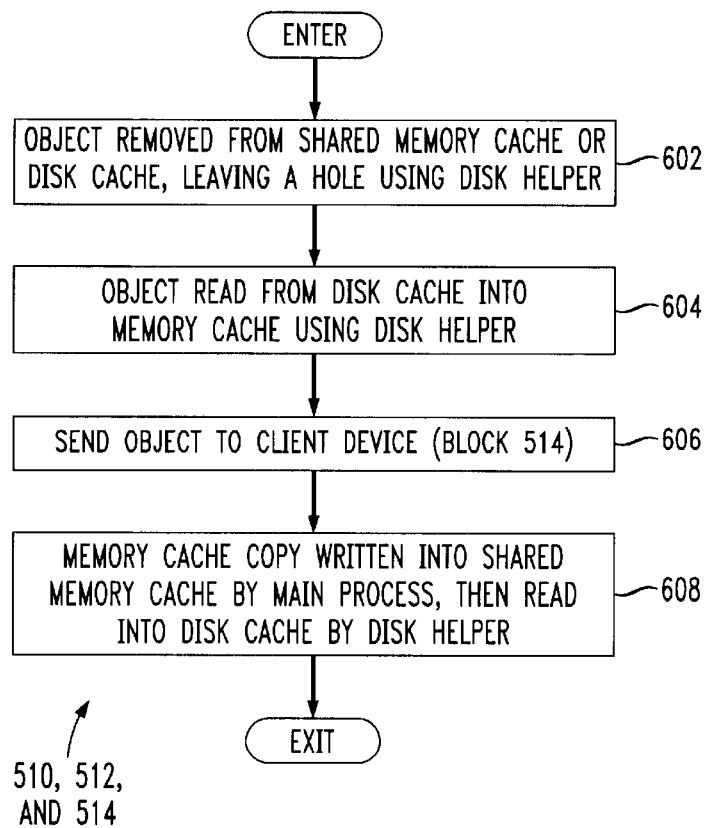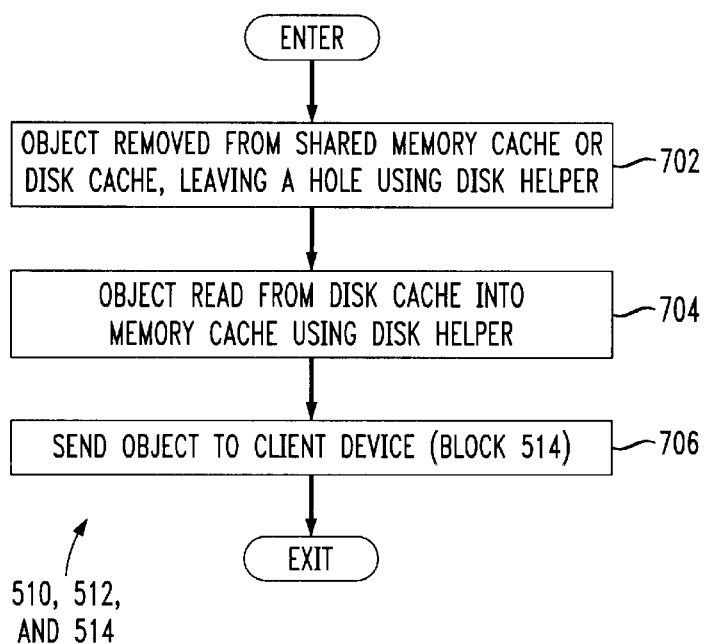

METHOD AND APPARATUS FOR CACHING WEB-BASED INFORMATION

BACKGROUND OF THE DISCLOSURE

1. Field of the Invention

The invention relates to web-based communication systems. More particularly, the invention relates to cache systems for use in web-based communication systems.

2. Description of the Background Art

The use of the Internet and other web-based communication systems is expanding at an exponential rate. The Internet is organized as a series of client devices (usually computers or microprocessor-based devices) containing a web browser that requests and obtains web objects stored in remote server devices. Requests for information include a uniform resource locator (URL) such as www.YYY.com/Z where www.YYY.com is the address of a specific server device and "Z" is a web object within that specific server device. To supply a web object to a client device, a request (including the URL) first has to travel from the client device to the server device, the server device has to access the web object, and then the web object must travel from the server device to the client device. This round-trip travel may consume considerable time especially if the server device is located far from the client device, or if the network is transferring data slowly.

One solution for improving web based communication throughput involves the use of a caching device. The caching device stores web objects that can be accessed by requests from client devices without requesting the object from a remotely located server. Due to the proximity of the caching device to the client device and the speed of the caching device, the time for requests containing URLS to be fulfilled may be decreased compared with fulfilling the same object directly from the server device. Cache memory is typically either located in the main memory or the disk memory of the caching device. Since disk memory (in disk drives) typically has considerably more storage space for data than main memory, most web objects stored in caching devices are stored in the disk memory. A caching device generally responds more quickly to requests if it is located quite close to the client device (both of which may be located thousands of miles from the server device). In these cases, the caching device will be able to respond to most requests from the client device sooner than the server device.

Certain Internet caching devices treat web objects as a file, and permit the file system of the caching device to manage the storage and retrieval of the web objects. There are, however, at least two disadvantages to this technique. First, file access requires at least one open, read, write, or close operation corresponding to the directories that contain the file. Such operations are time consuming. For example, a typical 400 MHz PENTIUM® (PENTIUM is a trademark of the Intel Corporation) system using a typical browser in which a file system is used to access web objects, an open( ) operation requires anywhere from 0.1 ms to 0.3 ms; a read( ) operation requires from 0.03 ms to 1 ms; a write( ) operation requires from 0.12 ms to 0.1 ms; and a close operations requires from 0.01 ms to 0.3 ms. Assuming multiple open( ), read( ), and close( ) calls for a multi-level directory and the files associated with each of the web objects, a file access can require as much as 2 ms. This time span to respond to a request reduces the number of disk requests that can be accommodated by a caching device.

Second, present file systems typically support many layers of directories and files. Names of web objects can expand to 256 characters in length. Meta-information is a data structure stored in main memory 126 that stores the memory locations of where the cached web objects are started within the caching device. Therefore, if there are a million files stored in a caching device, the meta-information associated with storing the names of the web objects can be as large as 250 Mbytes. Since the amount of meta-information is too large to all be stored in the main memory simultaneously, a large number of memory swap operations become necessary to switch the requested files associated with meta-information name files into the memory location where the meta-information can be accessed. Memory swap operations are time consuming and further limit the number of requests that can be handled by the caching device. Response rate (number of URLs per second) is a measure of performance of a server. Providing a high response rate requires access of a large number of memory swap operations, since each URL is typically requesting a web object stored in the memory.

Overall, while the multi-level directory structure is flexible in terms of creating a dynamic structure for retrieval of the web objects in caching devices, it does create a time-consuming overhead for caching devices to respond through the layers of the directories and in file name matching in providing a cached web object when a request is received.

SUMMARY OF THE INVENTION

It is desired to provide a caching device comprising a disk cache that stores web objects. Each web object stored in disk cache is stored in contiguous storage space locations in the disk cache. Each pair of temporally successive web objects stored in the disk cache are stored in substantially sequential storage space locations in the disk cache.

One aspect of the caching device includes a shared-memory cache that stores web objects and a main memory cache that stores web objects. The web objects stored in cache memory are first written into main memory cache. When the main memory cache becomes filled, at least some of the web objects stored in the main memory cache are written into shared-memory cache. When the shared-memory cache becomes filled, at least some of the web objects stored in the shared-memory cache are written into disk cache.

Another aspect of the caching device provides for storing web objects in the disk memory without using a file system. Providing for a cache device that stores web objects in substantially sequential storage space locations in the disk cache, and does not use a file system with the accompanying overhead, enhances the rate at which the web objects can be retrieved from the disk cache.

BRIEF DESCRIPTION OF THE DRAWINGS

The teachings of the present invention can be readily understood by considering the following detailed description in conjunction with the accompanying drawings, in which:

FIG. 4A is a block diagram of one embodiment of memory allocation within a disk memory;

FIG. 4B is a block diagram of another embodiment of memory allocation within a disk memory;

FIG. 6 is a flow chart of one embodiment of method for storing a cached web object into a caching device; and FIG. 7 is a flow chart of an alternate embodiment of method for storing a cached web object into a caching device.

To facilitate understanding, identical reference numerals have been used, where possible, to designate identical elements that are common to the figures.

DETAILED DESCRIPTION

I. Caching Device Structure

One embodiment of a web based communication system 100 includes a client having a variety of caches, including a disk cache. Cached web objects 152 are stored as raw data in the disk cache without using file system management overhead. The data is read or written from the disk cache without using file system-based file names and the associated overhead. The direct reading and writing of raw data respectively from and to the disk cache provides enhanced speeds at which the client device can access or store web objects.

Figure 1:
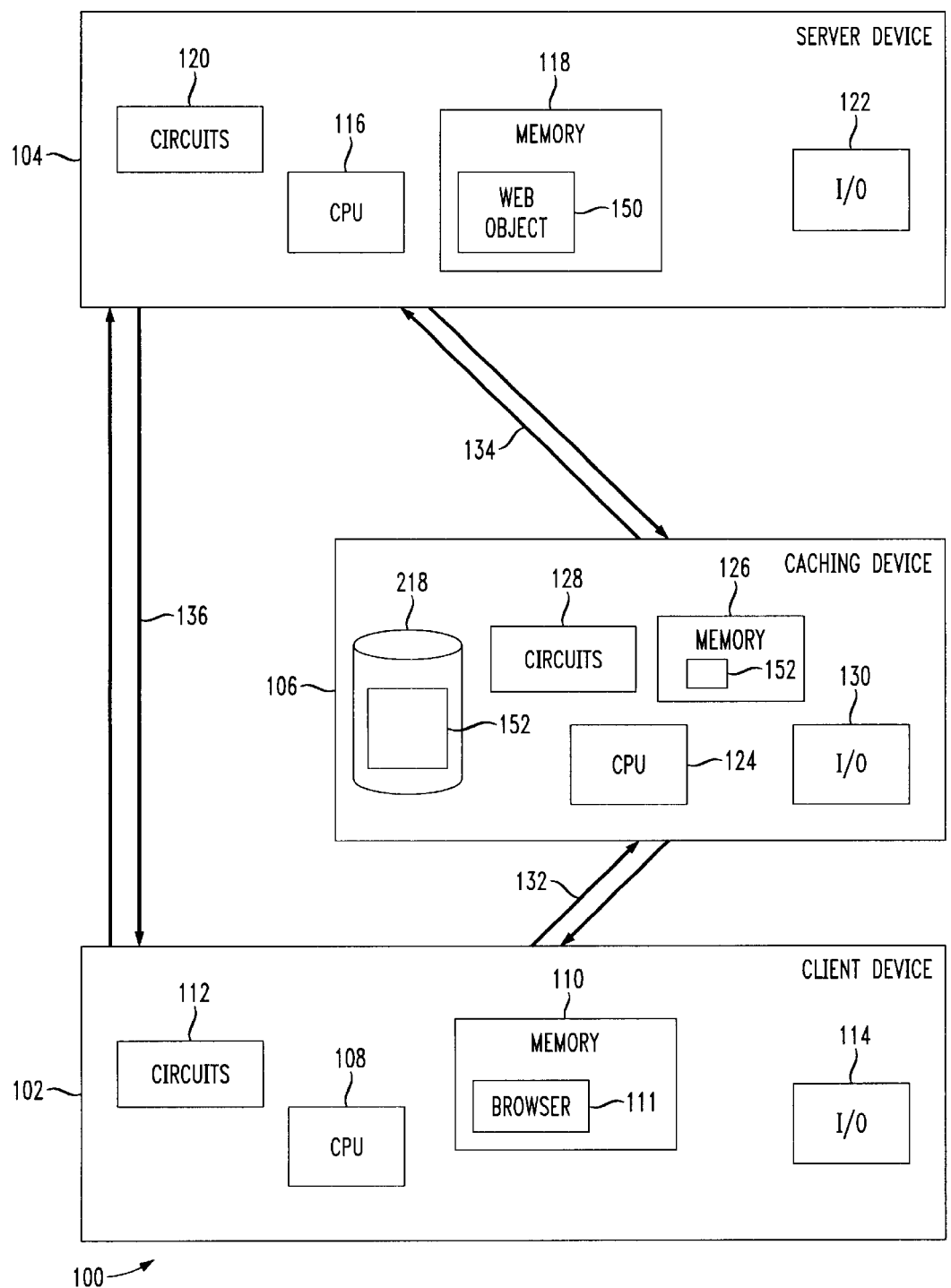
FIG. 1 is a block diagram of one embodiment of web-based communication system comprising a caching device of the present invention.

FIG. 1 shows one embodiment of the web based communication system 100 that may be in the form of the Internet, an intranet, a plurality of networked computers, or any other known web based communication system. The web based communication system 100 comprises a client device 102, a server device 104, and a caching device 106. The client device 102 comprises a CPU 108, a memory 110 containing a browser 111, circuits 112, and I/O device 114. The server device 104 comprises CPU 116, a memory 118 capable of storing web objects 150, circuits 120, and an device 122. The caching device 106 comprises CPU 124, memory 126, circuits 128, an I/O device 130, and one or more disk memories 218. Both memory 126 and disk memory 218 are configured to store cached web objects 152. The disk memories (also known in the art as disk drives) are of the type produced by International Business Machines Corporation, Seagate Technologies, Incorporated, and a variety of other companies. A data link 132 is connected (and provides two-way digital transmissions) between the client device 102 and the caching device 106. A data link 134 is connected (and provides two-way digital communication) between the caching device 106 and the server device 104. An optional data link 136 is connected (and provides two-way digital communication) between the client device 102 and the server device 104.

Each client device 102, caching device 106, and server device 104 may be a general-purpose computer, a microprocessor, a micro-controller, or any other known type of computer. CPUs 108, 124, and 116 perform the processing and arithmetic operations for respective client device 102, caching device 106, and server device 104. CPUs 108, 124, and 116 are each of a type produced by Intel, Motorola, Texas Instruments, Advanced Micro Devices, and a variety of other companies. The operation of CPUs is generally known to those skilled in the art.

Browser 111, contained primarily in memory 110 of the client device 102, is configured to access information (including web objects) from server device 104. The browser 111 may be a NETSCAPE NAVIGATOR®, an INTERNET EXPLORER®, or any other known type of browser that can operate in the web based communication system 100.

The memories 110, 126, and 118 include random access memory (RAM) and read only memory (not shown) that together store the computer programs, operands, and other parameters that control the respective operation of the client device 102, caching device 106, and server device 104. The memory 118 in the server device 104 likely comprises a disk memory that is configured to store web objects. In the caching device, a plurality of cached web objects 152 (each of which is a copy of a particular web object 150 stored in memory 118 of the server device 104) may be stored in the storage spaces defined by either the memory 126 or the disk memory 218 as described below.

I/Os 114, 130, and 122 are configured to provide an interface to control the transmissions of digital information between the respective client device 102, caching device 106, and server device 104. Circuit portions 112, 128, and 120 comprise all of the other user interface devices (such as display and keyboard), system devices, and other accessories associated with the respective client device 102, caching device 106, and server device 104. Circuit portion 128 controls the reading of web objects from, and the writing of web object to, the different memory locations within the memory 126 and the disk 218.

Data link 136 is included in the embodiment shown in FIG. 1 to show that communication over data links in web-based communication systems may alternatively be provided without a caching device 106. For a client device 102 to obtain a web object from a server device 104, it must submit a request accompanied by a universal resource locator (URL) such as www.YYY.com/Z, where www.YYY.com represents the name of the server device 104 and "z", identifies a web object 150 within server device 104. A domain name system (DNS) translates the server name (e.g., www.YYY.com) into a numerical address (e.g., an Internet Protocol Address). The client device 102, the caching device 106, and the server device 104 use the Internet Protocol Address to communicate with each other.

When client device 102 is configured to use the caching device 106, the request to retrieve a web object from the server is sent to the caching device 106. If the object is in the caching device's memory, the caching device 106 sends the object back to the client without retrieving it from the server. If the object is not in memory, the caching device retrieves it from the server and passes it to the client.

The caching device 106 can be located closer to the client device 102 than the server device 104. This assumption of relative location is usually accurate since there is often only a handful of server devices 104 in the world that contains a particular web object. By comparison, there are numerous caching devices 106 that may be located around the world that are situated to respond quickly to HTTP requests from a wide variety of client devices 102. For example, in a corporate environment, an object served from a caching device 106 may take less than 10 milliseconds, while the same object retrieved from a remote server device can take more than one second. Caching devices 106 can therefore provide an effective and quick alternative source of web objects for client device 102 to the server device 104, provided that the caching devices contains a significant number of web objects being sought by the client device 102.

Figure 2:
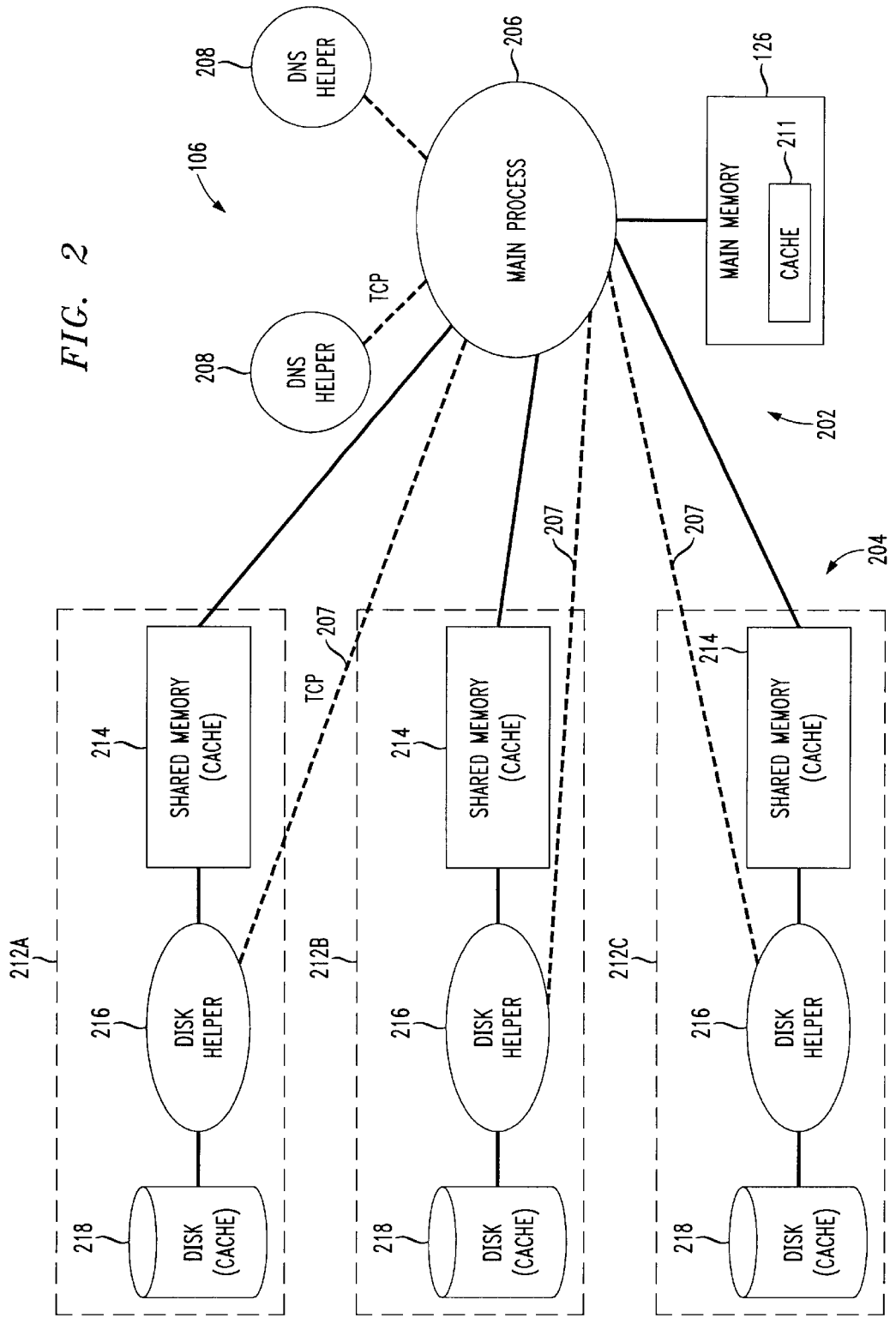
FIG. 2 is a block diagram of one embodiment of caching device.

FIG. 2 shows a block diagram of one embodiment of caching device 106 comprising three processes and three types of cache. The three processes are the main process 206, the disk helper process 216, and the DNS helper process 208. The three kinds of cache are the memory cache 211, the shared memory cache 214, and the disk cache 218.

The memory cache 211 and the shared memory cache 214 are located in main memory 126; the disk cache 218 consists of storage space provided by one or more disk drives. As the name implies, the shared memory cache 214 is a portion of the caching device's random access memory (RAM) that allows both the main process 206 and a disk helper process 216 to share data. Data written to the storage spaces of the shared memory cache by the main process can be accessed by the corresponding disk helper process. Also, data written to the storage spaces of the shared memory cache by the any of the disk helper processes can be accessed by the main process.

The main process 206 is responsible for retrieving objects from the web server devices 104. The main process 206 stores each retrieved object in the memory cache 211. Because the memory cache 211 has a limited capacity, when the memory cache 211 is full, the main process removes one or more objects from the memory cache 211 and places them in the shared memory cache 214. This freeing of memory space in the memory cache 211 permits for further retrieved objects to be stored in the memory cache 211 in the freed memory locations.

The objects stored in the shared memory are preferably stored in contiguous memory storage spaces in memory such that there is no fragmentation or segmentation of the data forming each web object. Each pair of web objects that are temporally successively stored in the shared memory are stored in substantially sequential storage space locations such that the beginning of one object is stored immediately after (or closely spaced from) the end of the preceding object. When the main process 206 detects that the used space in the shared memory has reached a prescribed threshold, the main process 206 sends a message to the corresponding disk helper 216 over the communication channel 207 indicating a desired transfer of data therebetween. The disk helper receives the message from the main process over the communication channel, and typically writes the entire contents of the shared memory cache 214 (or any desired percentage of the contents of the memory) to the disk cache 218. After the disk cache 218 stores the contents of the shared memory cache, the disk helper 218 sends an acknowledgement (e.g., ACK) message across the communication channel back to the main process 206, allowing the main process to reuse the memory space in the shared memory cache 214.

Because translation of site names (e.g., www.YYY.com) to its Internet Protocol (IP) address may require contacting a geographically distant DNS server. The main process 206 uses at least one DNS helper process 208 to facilitate the name-to-address translation. To improve throughput, a DNS helper 208 can work on the translation for a client independently from, and substantially concurrently with the main process 206 handling requests from other clients. Furthermore, the main process 206 maintains a table of name-to-address mappings obtained from the DNS helper. If a name-to-address mapping is already in the table, the main process accesses and uses the mapping without contacting a DNS process.

Similar to the communication between the main process 206 and a disk helper 218, the main process may transmit requests and receive replies from a DNS helper over communication channel 207. Communication channel 207 can be any inter-process communication mechanism available that is presently utilized in communication systems. For example, an embodiment of inter-process communication channel using Transmission Control Protocol (TCP) is illustrated in FIG. 2.

Referring to both FIGS. 1 and 2, the general operation of the web based communication system 100 is now described. The client device 102 transmits a request including the URL for a particular web object to the server device 104 over data link 132. The request is received by the caching device 106. The caching device 106 searches the memory 126 (including main memory 126 and shared memory 214) and the disk memory 218 for an occurrence of the cached web object 152 that corresponds to the web object 150. If the cached web object 152 that corresponds to the web object 150 is located in either the memory 126 (in either the main memory cache 211 or the shared memory cache 214) or the disk memory 218, then the cached web object 152 is sent to the client device 102.

If there is no cached web object 152 found in either the memory 126 (in either the main memory cache 211 or the shared memory cache 214) or the disk memory 218 of the caching device 106 that corresponds to the requested web object 150 stored in the server device 104, then the caching device forwards the request to the server device 104 over the data link 134 to access the web object 150 directly from the server device 104 when the server device 104 receives the request, the web object 150 is copied and transmitted over the data link 134 to the caching device.

Web objects 150 transmitted from the server device 104 to the caching device 106 are categorized as either cacheable or non-cacheable depending upon whether a copy of that particular web object is to be stored in the caching device 106. Non-cacheable web objects include confidential and time-sensitive web objects. A flag in the header of the data comprising the web object 150 physically indicates whether each particular object is cacheable or non-cacheable. If a non-cacheable web object 150 is returned from the server device 104 over the data link 134 to the caching device 106, then the web object is forwarded directly to the client device 102 over data link 132 without the caching device 106 storing a cached web object. If a cacheable web object 150 is returned over data link 134 to the caching device 106, the caching device 106 copies the object to the memory cache 211 and also forwards the object to the client device 102 over data line 132. The web object 150 is then forwarded to the client device 102 over data link 132. The browser 111 in the client device 102 interacts with the cached web object 152 from the caching device 106 in the same manner as it interacts with the web object 150 from the server device 104.

Figure 3:
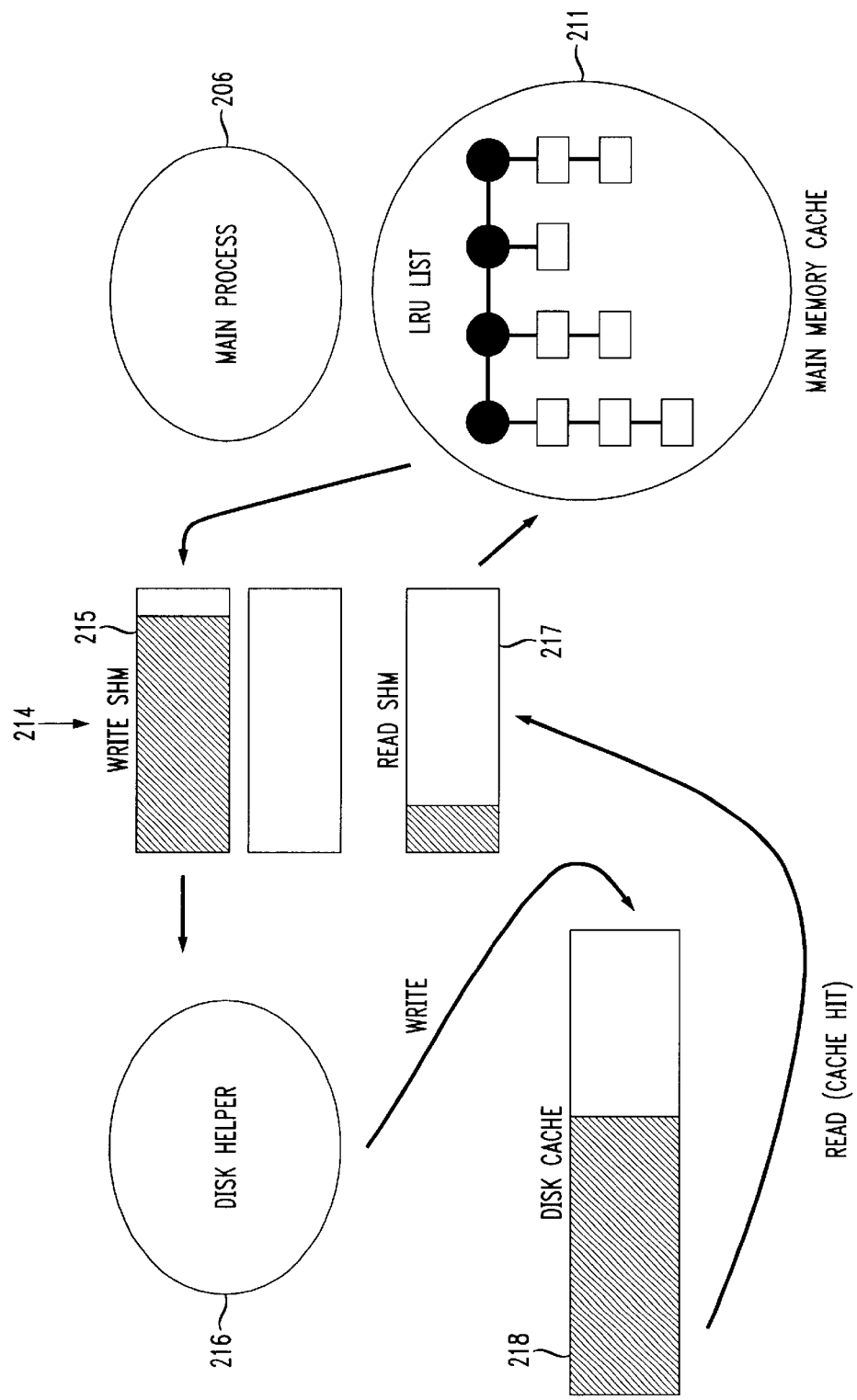
FIG. 3 is a block diagram of one embodiment of response to cache memory information transfer between the memory locations within a caching device.

The main process 206 is performed by CPU 124 and handles requests for web objects from client device 102 to the caching device 106, determines whether the caching device 106 is storing a cached web object 152, and maintains and updates meta-information relating to the location of the cached web objects. The main process 206 conveys data to/from the disk helper 216 using shared-memory 214 as shown in FIG. 3. In particular, there is one disk 218, one disk-helper process 216, and one shared-memory 214 associated with each disk web object portion 212a, 212b, and 212c. Though three disk web object portions 212a, 212b, and 212c are in the caching device 106 shown in FIG. 2, it is envisioned that one or more disk web object portion may be used.

The shared-memory 214 comprises a write shared-memory 215 and a read shared-memory 217. The write shared-memory 215 is used to write web objects from the main memory cache 211 to the disk cache 218. The read shared-memory 217 is used to read cached web objects 152 from the disk cache 218 to the memory cache 211. There is only one writer in the write shared-memory 215, and there is one reader in the read shared-memory 217. This use of one reader and one writer limits the need for locking techniques to be applied to the shared-memory 214. Limiting the locking improves reading and writing performance of the web objects within the caching device 106 significantly.

A cache hit occurs when the cached web object 152 that is requested by the client device 102 is stored in any memory location (main memory 126, shared memory 214, or disk memory 218) in the caching device 106. The caching device has to determine whether there is a cache hit when a request for a web object is transmitted from client device 102 to the caching device 106. Meta-information is used to determine whether there is a cache hit. Meta-information is a data structure stored in main memory 126 that identifies the location of where the cached web objects 152 are stored within the memory cache 211, the shared-memory cache 214, or the disk cache 218. After receiving the request from the client device 102, the main process 206 checks the meta-information to determine the specific address of a cached web object 152 corresponding to a request is a cache hit. If there is a cache hit, caching device 106 will then retrieve the cached web object 152 from the appropriate memory location and transmit the cached web object over the data link 132 to the client device 102. If there is no cache hit, then caching device 106 will open a connection with server device 104 to request the server device 104 transmit the web object 150 to the client device 102.

The caching device 106 operates slightly differently depending on whether the cached web object 152 is in memory cache 211, shared-memory cache 214, or disk cache 218. First, if the cached object is stored in memory cache 211, the main process serves the object directly from memory cache 211. Second, if the cached object is stored in shared-memory cache, the main process moves the object from shared memory 214 to main memory 211 and serves the object from memory cache 218. Third, if the cached object is in disk cache 218, the main process informs the associated disk helper to read the object from the disk memory to the shared-memory associated with the disk helper. The main process then moves the object from the shared-memory to memory cache, and then serves the object from memory cache. In this way, the set of most popular web objects, which are accessed most frequently, will reside in memory cache 211.

The disk helper 216 (or each disk helper in each disk web object portion 212a, 212b, and 212c) operates distinctly from, but under the control of, the main process 206. The disk helper 216 also occupies a separate address space from the main process 206 and all other disk helpers. The memory space in shared-memory 214 has to be explicitly set aside, and arrangements have to be made to share this memory space between the appropriate disk helper 216 and the main process 206—it is not a default selection. This shared-memory technique provides an efficient way for exchanging data between the main process and each of the disk helper processes.

It is envisioned that the shared-memory cache 214 may not be used in certain embodiments, and the disk helper 216 would read or write cached web objects directly between the main memory cache 211 and the disk cache 218. The disk helper can read and write directly into the main memory as long as access to the main memory cache is configured to be shared between the main process and the disk helpers (this is not a default selection). To allow such sharing of the main memory cache by the main process and the disk helpers, a lock in may be required to enforce the integrity of the data stored in the main memory.

Currently, access latency of the disk memory is in the order of milli-seconds because it involves the movement of mechanical parts. In contrast, main memory access latency is in the order of micro-seconds or less because it utilizes electronic components and operates at electronic speed. To achieve high throughput, the main process does not access disk cache directly. Instead, it uses one or more disk helper processes. While waiting for a disk cached object being accessed, the main process can handle other incoming requests, thus improving throughput. The more disk memory used, the better throughput the caching device can provide, because the caching device distributes web objects substantially evenly across the available disk memory devices, and uses all the disk helpers in parallel to access disk memory.

Software and hardware resources in the caching device 106 should be configured to handle the desired number of requests per second. The parallel aspects of disk helpers 216 is shown in the embodiment of FIG. 2. Each disk helper 216 in the different disk web object portions 212a, 212b, or 212c is dedicated to handling the operations on the disk memory 218 located in that particular disk web object portion 212a, 212b, or 212c. The main process 206 coordinates the activities (read and write operations) of each of the independently operating disk helpers 216.

If the main process directly performs either writing and reading to each of the disk caches 218, then the parallel disk configuration within disk web object portions 212a, 212b, and 212c is not being utilized for optimum speed. However, one peripheral process comprising a disk helper 216 can be dedicated to each disk cache 218 for each of the disk web object portions 212a, 212b, and 212c. For instance, during the time that the main process 206 is writing to the disk cache, the CPU 124 is devoted exclusively to the writing process. The disk helper is peripheral (not a portion of the CPU 124) in the embodiment shown in FIGS. 1 and 2. Therefore, the disk helper and not the main process performs the read/write operations for each of the respective disk caches 218. A major advantage of using the disk helper is to assist in accessing the disk cache because access of the disk cache by the main process is relatively slow.

During the process of writing cached web objects 152 into the disk cache 218, cached web objects 152 are initially stored in the memory cache 211. The main process 206 removes cached web objects 152 from the main memory cache 211 when room is needed for new web objects 152. The main process 206 then writes the removed cached web objects 152 into write shared-memory cache 215. When the size of objects in write shared-memory cache 215 exceeds a predefined threshold, the main process sends a command across the communication channel 207 to the associated disk helper. The disk helper receives the command and writes all the data in the write shared memory to the disk device 218. Note that at least two write shared memory regions are used. For example, FIG. 3 illustrates the write shared-memory regions. While the disk helper is writing the data in one write shared-memory region, the main process can continue to store objects to be written to the disk memory in the other write shared-memory region. A number of cached web objects 152 are therefore collected in the write shared-memory cache 215 and they are all written into the disk cache 218 simultaneously. This transfer of all the cached objects from the write shared-memory cache 215 into the disk memory 218 thereby allows other cached web objects 152 to be written from main memory cache 211 into the write shared memory 215. It is not desirable to write one cached web object 152 at a time from the write shared-memory cache 215 into the disk cache 218 since a distinct write operations for every cached web object 152 would be inefficient.

If caching device 106 receives a request for a web object that represents a cache miss, the web object is retrieved from the server device 104. The retrieved web object is first stored in the main memory cache 211. When the memory cache 126 fills up, some web objects are written into a shared-memory cache 214 by the main process 206. Which web objects are read from the memory cache 211 depends on the cache replacement policy.

Two illustrative cached web object replacement policies that are described below relative to FIGS. 4A and 4B, respectively. The described policies are intended to be exemplary of the type of policies that are applicable to the present invention. Other policies may also be used. FIGS. 4A and 4B both depict respective memory queues 400, 401 comprising memory segments 406a, 406b, and 406c. Each memory segment 406a, 406b, and 406c corresponds to memory locations in the disk memory 218 (located in the respective disk web object portions 212a, 212b, and 212c). Alternatively, the memory queues 400, 401 could be located in one or any multiple number of disk web object portions. The memory queues 400, 401 can be considered a memory continuum for storing raw data that is formed from one or a plurality of disk memories 218. Disk helper 216 writes all the web objects in the write shared-memory cache 214 into the end 404 of the queue 400. The disk write operation is efficient because all the objects in the write shared-memory are combined into a single large object and then written to the disk device in a single write operation.

The cached web object is stored in the memory cache 211, the shared memory cache 214, and the disk cache 218 provided that the length of the web object is not too large (within a prescribed limit dependant upon the memory sizes used in the caching device 106). If the length of the web object is too large, then the web object could not be stored as contiguous data (the data is not segmented or fragmented) in the memory caches 211, 214, and 218 due to the memory size limitations, and any request for the web object has to be directed to the server. The term contiguous data indicates that the data not be segmented or fragmented into multiple distinct storage space locations. Therefore, only contiguous web objects are stored in either the memory cache 211, the shared memory cache 214, or the disk cache 218. The use of contiguous data is important in retrieving web objects from the memory queue since a high retrieval rate is desired, and combining segmented or fragmented data would slow down the retrieval of the web objects.

The embodiment of memory queue 400 illustrated in FIG. 4A results from cached web objects 152 being moved from the disk cache 218 via the read shared memory 217 into the main memory cache 211 as shown in FIG. 3. The area in the disk memory 218 where an object was read from becomes an unused space 402 because the object has been transferred to the main memory cache 211 and the meta-information for the object has been updated accordingly. Occasionally, the unused space 402 can be coalesced within queue 404 to create a bigger, contiguous memory storage space for storing new web objects in a contiguous manner. The coalescing process involves moving the cached objects in the front of the queue to the end 404 of queue 400. The meta-information of those objects that are moved must be updated to reflect their new locations.

FIG. 4A embodiment illustrates a least recently used (LRU) object replacement policy. That is, the cached objects in the queue are ordered from left to right (as shown by arrow 408) based on the time at which they are accessed in a substantially sequential manner. The objects on the right end have more recent access time (are stored most recently) than the objects on the left end. The substantially sequential storing of the cached web objects in the storage space locations in the disk cache based upon the time that the web objects are accessed optimizes the space in the disk cache that can be used to store the web objects. Providing brief header or blank memory storage spaces between sequential web objects (for whatever purpose) is within the intended meaning of stored in substantially sequential memory storage spaces (for whatever purpose). The written cached web object 152 is stored at the end 404 of the queue 400.

Another embodiment of queue 401 is shown in FIG. 4B. In this embodiment, a request for a cached web object 152 yielding a cache hit in the caching device 106 results in a cached web object 152 being read from the disk cache 218 via the read shared memory cache 217 to the main memory cache 211. During reading, the cached web object 152 remains in the queue 401 in the FIG. 4B embodiment. No holes are thus created in the queue 401 during reading. Cached web objects 152 that are temporally successively received are therefore stored in substantially sequential memory storage space locations as raw data 418 in queue 401 that does not need to be coalesced. For instance, assuming that new web objects to be written into the queue are to be written to the right of line 420, the next three temporally received web objects written into the queue 401 are shown by web objects 440a, 440b, and 440c. The web objects 440a, 440b, and 440c are stored in a substantially sequential memory storage space locations. The line 420 representing the storage space location where the next web object is to be stored thereby moves to the right in FIG. 4B (as indicated by arrow 422) as more web objects are written into queue 401. As soon as the line 420 reaches the right side of the queue 401, the line starts again by writing the cached web objects at the left side of the queue 401 (known as wrap-around).

If the entire web object is not written in the queue 401 before the right side 446 of the memory location is reached, the entire web object will be re-written from the left side 448 of the memory queue to provide that each web object is stored in contiguous memory storage locations. New cached web objects 152 thus write over the oldest stored web objects at location 426, thus providing a circular buffer write arrangement in queue 401 (also known as "a front chasing a tail", buffer arrangement). The writing replacement of cached web objects from the disk mimics a first-in-first-out (FIFO) cache replacement policy in which more recently used web objects may be replaced based upon their location in the disk queue.

To provide an exemplary indication of the relative cache sizes, using existing memory technology, the main memory 126 may be 50 Mega-bytes (MB), each shared-memory 214 may be 8 MB, and each disk memory 218 may be 8 Giga-bytes. Of course any appropriate cache size could be used while remaining in the scope of the invention.

Managing the movement of the disk head (not shown) when accessing objects from disk memory 218 can enhance the throughput of the caching device. Each of the disk helpers 216 may use a scheme to minimize the head movement of the associated disk device 218. The following example illustrates how the scheme works. Suppose the disk memory is numbered from location 0 to 100, and the position of the disk head is at location 80. The disk helper receives three requests to access three web objects at locations 10, 70, and 30. If the disk helper processes the requests in the order they arrive, the disk head movement will be from location 80 to 10, and then to location 70, and finally to location 30. The total distance that the disk head travels is (80−10)+(70−10)+(70−30) or 170.

Now, consider the scheme used by the disk helper to minimize disk head movement. The disk helper does not process the requests as they arrive; instead, it buffers the requests until a predefined threshold of web objects (e.g., 3) is reached or until a timeout (e.g., 10 milli-seconds) occurs. The disk helper then reorders the requests in a way that the disk head movement is minimized. In the above example, the disk helper will process the second request first, and then the third, and finally the first request. The disk head movement is thus from location 80 to 70, and then to location 30, and finally to 10. The total distance the disk head travels is (80–70)+(70–30)+(30–10) or 70. Minimizing the distance the disk head travels improves disk access performance because the total "seek time" of the disk device for accessing a set of objects is minimized.

The web based communication system 100 provides an indexing mechanism that indicates where the cached web object is located at one particular raw data memory locations, as shown in the embodiment of FIG. 7 (described below). This indexing technique keeps track of the location of every web object that has been found by a cache hit or by retrieving from a remote server device 104.

II. Operation of Caching Device

Figure 5:
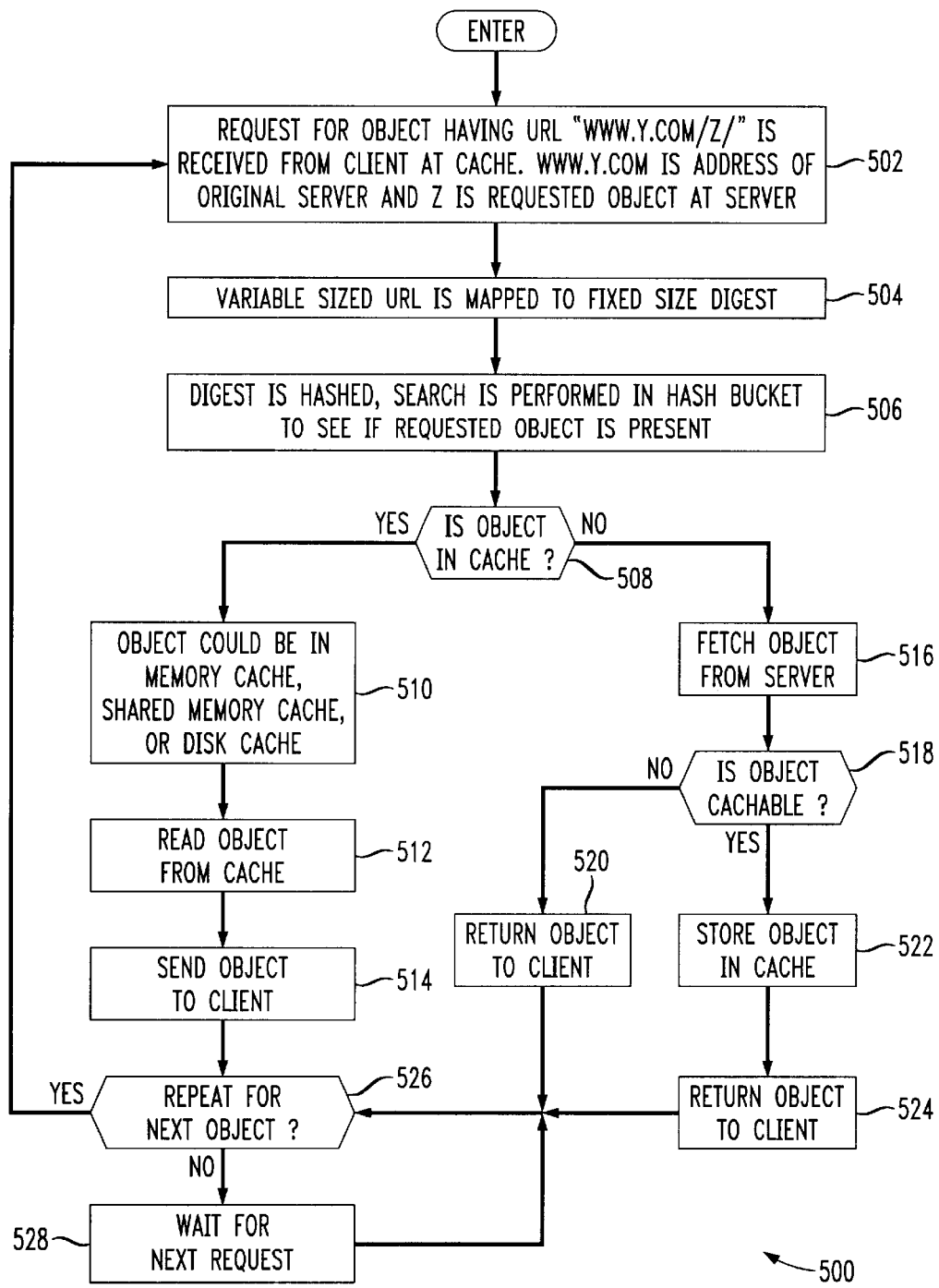
FIG. 5 is a flow chart of one embodiment of the operation of a caching device upon receipt of a request for a web object.

The operation of embodiments of caching device 106 are shown in FIGS. 5, 6, and 7. In block 502, a request for a web object 152 is received at the caching device 106 (the request was transmitted by the client device 102). Requests for information include a uniform resource locator (URL) such as www.YYY.com/Z where www.YYY.com is the address of a specific server device and "Z" is a web object within that specific server device. In step 504, the variable size URL is mapped to a fixed size string that represents a message digest of the URL. Message digest techniques such as MD5 can be used to map the URL. A fixed size digest string is desirable in the caching device because it makes the size of the meta-information for each cached object fixed, thus making the access of the meta-information efficient. MD5 is a publicly available algorithm for creating a message digest. MD5 implementation in C computer language is also publicly available.

In step 506, the fixed size digest is used to compute a hashing index. Hashing is a technique commonly used to allow fast retrieval of information. The meta-information for each object is maintained by an array of linked list. Each node in the linked list corresponds to the meta-information of a cached object. To determine whether an object is in the cache, the main process 206 generates a digest using the object's URL, and then computes an array index using the digest. Once the array index is available, the main process 206 searches the linked list for the array index. A match between the object's digest and a node's digest indicates the object is in the cache; otherwise, the object is not in the cache. The meta-information further indicates where the object is located, thus allowing the main process 206 to retrieve the object from the cache. Retrieving a requested object from the cache is known as a "cache hit."

Method 500 continues to decision block 508 in which the operation of the caching device 106 varies depending upon if there is a cache hit. A cache hit would be indicated in the meta-information value stored in the main memory. If the answer to decision block 508 is YES, then there is a cache hit and the cached web object 152 is in either the main memory 126, the shared-memory 214, or the disk 218. Method 500 continues to block 512 in which the cached web object 152 is read from the appropriate cache location indicated by the meta-information using either the destructive read or the non-destructive read techniques described above with respect to FIGS. 4A and 4B, and described further below with respect to FIGS. 6 and 7. In block 514, the cached web object 152 is sent to the client device 102. The method 500 continues to decision block 526 as described below.

If the answer to decision block 508 is NO, then method 500 continues to block 516 in which the web object 512 is fetched from server device 104. Block 516 may take some time, so block 516 may comprise an interrupt that permits the caching device to perform another operation while the web object 150 is being fetched from a remote server.

After the web object 150 is fetched in block 516, method 500 continues to decision block 518 in which a caching device 106 determines whether the object is cacheable. Reasons why a web object may not be cacheable include knowledge that the web object contains sensitive or private information such as credit card information or that the web object information is time sensitive and it is likely to change based upon time. The header information of the web object 150 indicates whether the web information is cacheable. If the answer to decision block 518 is YES, then method 500 continues to block 522 in which the web object 150 is stored in the caching device 106. Initially, in block 522, the cached web object 150 will be stored in the main memory 126 in cache as a cached web object 152 without having to write over existing cached web objects 152. After a number of other web objects 150 have been read into the main memory, the cached web object 152 may be transferred first to the shared-memory 214, and then to the disk 218. The cached web object 152 is stored as raw data contained in one disk cache 218. During each of these transitions, the location of the web object is accurately maintained in meta-information that is located in the main memory 126. Following block 522, method 500 continues to block 524 in which the cached web object 152 is returned to the client device 102. Following block 524, the method 500 continues to decision block 526 as describe below.

By comparison, if the answer to decision block 518 is NO, then the method continues to block 520 in which the web object 150 is returned to the client. The web object 150 will not be stored in the caching device 106 following block 520 because the object is not cacheable. The method 500 continues to decision block 526 as described below.

Following either block 514, block 520, or block 524 method 500 continues to decision block 526 in which the CPU 124 of the caching device 106 waits for further web object from the client device 102 (or another client device in communication with the caching device 106). If the answer to decision block 526 is YES, then the method 500 continues to block 502. If the answer to decision block 526 is NO, then the method 500 continues to block 528 in which the method 500 loops until the next request for a cached web object is received by the client device.

FIGS. 6 and 7 show two embodiments that perform the logic depicted in blocks 520, 512, and 514 of FIG. 5. FIG. 6 shows a destructive read procedure while FIG. 7 shows a non-destructive read procedure. The FIG. 6 embodiment utilizes the disk memory 218 of the caching device 106 as a LRU memory queue 400 shown in FIG. 4A. The FIG. 7 embodiment a FIFO memory queue 401 as shown in FIG. 4B.

If a destructive read is to be performed within blocks 510, 512, and 514 of the embodiment shown in FIG. 5 (within the cached web object 152), then method 600 starts block 602 in which the cached web object 152 is read directly from the shared-memory cache 214 or the disk cache 218 (wherever it is located). This reading process is performed under the shared control of the disk helper 216 and the main process 206. An unused space 402 is left behind in the respective memory that will eventually have to be removed by coalescing. In block 604, the cached web object 152 is written into the main memory cache 211.

The method 600 continues to block 606 in which the cached web object 152 is sent to the client device 102 with a copy being kept in the main memory cache 211. The method 600 then continues to block 608 in which the cached web object 152 stored in the main memory cache 211 is read into the shared memory cache 214 to make room in the memory cache 211 for storing new objects. Subsequently, the object may be read by shared-memory 214 into the raw data of the disk cache 218 by disk helper 216. When the object is inserted into the disk cache 218, it will be read at the end 404 of the memory queue 400 shown in FIG. 4A.

If a non-destructive read operation is to be performed, then the blocks 510, 512, and 514 shown in FIG. 5 are performed by the embodiment shown in FIG. 7. This embodiment begins at block 702 in which the cached web object 152 is copied from the shared-memory cache or the disk cache 218 (whichever one the cached web object is located in as indicated by the meta-information). In block 704, the copied cached web object 152 is read into memory cache 211. The method continues to block 706 in which the web object is sent to the client device 102. In block 706, the cached web object 152 is removed from the main memory cache 211 after it is sent to the client device, without being read back to the shared-memory cache.

Assuming that web objects are written, for example, from left to right in a queue 400 or 401, upon reaching the right side of the queue, "wrapping around" is considered the switch from the right-most side of the queue to writing to the left side of the queue. Wrapping around is simplified in non-destructive read operations (moving line 420 from the right side of memory queue 401 in FIG. 4B to the left side, deleting disk cached objects as needed) because there are no unused spaces to be coalesced.

Although various embodiments which incorporate the teachings of the present invention have been shown and described in detail herein, those skilled in the art can readily devise many other varied embodiments that still incorporate these teachings.

What is claimed is:

1. A method of retrieving a web object from a caching device, the caching device including a disk cache, the method comprising:
    storing a plurality of web objects in a main memory cache;
    transferring at least some of the web objects stored in the main memory cache to a shared-memory cache; and
    transferring at least some of the web objects stored in the shared-memory cache to the disk cache, wherein the web objects stored in the disk cache are stored as raw data in contiguous storage space locations of a circular buffer in the disk cache, and wherein each pair of temporally successive web objects stored in the disk cache are stored in substantially sequential storage space locations in the disk cache.

2. The method of claim 1, further comprising accessing the web objects stored in the disk cache.

3. The method of claim 2, wherein the accessing the web object from the disk cache is destructive to the web object stored in the disk cache.

4. The method of claim 2, wherein the accessing the web object from the disk cache is not destructive to a web object stored in the disk cache.

5. The caching device of claim 2, wherein the accessing the web object is performed in response to receiving a request for a web object at the caching device.

6. The method of claim 1, wherein web objects are first written into the main memory cache, when the main memory cache becomes filled, at least some of the web objects stored in the main memory cache are written into the shared-memory cache, when the shared-memory cache becomes filled, at least some of the web objects stored in the shared-memory cache are written into the disk cache.

7. The method of claim 1, wherein the disk cache comprises a plurality of disk memories, each disk memory includes distinct memory storage space locations.

8. The method of claim 7, further comprising transmitting the stored web objects to a client device.

9. A caching device configured to store a web object comprising:
    a main memory cache for storing a plurality of web objects;
    a shared-memory cache for storing at least some of the web objects transferred from the main memory cache; and
    a disk cache for storing at lease some of the web objects transferred from the shared-memory cache, wherein the web objects stored in the disk cache are stored as raw data in contiguous storage space locations of a circular buffer in the disk cache, and wherein each pair of temporally successive web objects stored in the disk cache are stored in substantially sequential storage space locations in the disk cache.

10. The caching device of claim 9, wherein the disk cache comprises a plurality of disk web object portions.

11. The caching device of claim 10 wherein each disk web object comprises a disk helper and a disk memory.

12. The caching device of claim 9, wherein web objects stored in the disk cache are replaced using a least recently used algorithm.

13. The caching device of claim 9, wherein web objects stored in the disk cache are replaced using a first-in first-out algorithm.

14. The caching device of claim 9, further comprising meta-information indicating the memory location of web objects within the main memory cache and the disk cache.

15. The caching device of claim 9, wherein at least some of the web objects stored in the main memory cache are written into the shared-memory cache when the main memory cache becomes filled, and at least some of the web objects in the shared-memory cache are written into the disk cache when the shared-memory cache becomes filled.

16. The caching device of claim 9, wherein the web objects are accessed from the disk cache.

17. A web based communication system comprising:
    a server device configured to store a web object;
    a client device; and
    a caching device configured to store copies of the web object, the caching device comprising:
    a main memory cache for storing a plurality of web objects;
    a shared memory cache for storing at least some of the web objects transferred from the main memory cache; and
    a disk cache for storing at lease some of the web objects transferred from the shared-memory cache, wherein the web objects stored in the disk cache are stored as raw data in contiguous storage space locations of a circular buffer in the disk cache, and wherein each pair of temporally successive web objects stored in the disk cache are stored in substantially sequential storage space locations in the disk cache.

18. The web based communication system of claim 17, wherein at least some of the web objects stored in the main memory cache are written into the shared-memory cache when the main memory cache becomes filled, and at least some of the web objects in the shared-memory cache are written into the disk cache when the shared-memory cache becomes filled.

* * * * *